P. CHAPPEAU.
PACKING.
APPLICATION FILED MAR. 14, 1913.
1,107,032.
Patented Aug. 11, 1914.
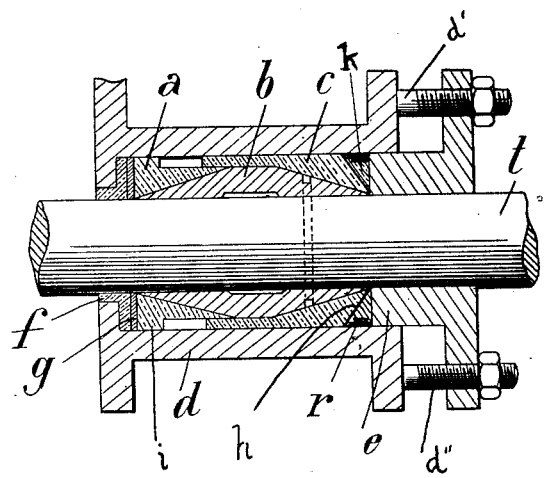
Witnesses:
Miriam Stern
Dudley Browne.
Inventor:
Paul Chappeau
By Jno. Inman Attorney

UNITED STATES PATENT OFFICE.

PAUL CHAPPEAU, OF SAINTES, FRANCE.

PACKING.

1,107,032.  Specification of Letters Patent.  Patented Aug. 11, 1914.

Application filed March 14, 1913. Serial No. 754,272.

*To all whom it may concern:*

Be it known that I, PAUL CHAPPEAU, a citizen of the French Republic, and resident of Saintes, France, have invented certain new and useful Improvements in and Relating to Packings, of which the following is a specification.

This invention has for its object a system of packing made of metal or any other material allowing of a progressive tightening and adapted to be taken to pieces, this system of packing allowing of the tightness of movable sliding or rotary parts of steam, air and water engines being obtained at the highest pressures, such parts being piston rods, slide valve rods of steam engines, piston rods and pistons of water pumps as well as all parts requiring an absolute tightness such as sliding joints for steam collectors, gage tubes, stern tubes and so on.

A further object of this invention is to provide a packing of the class described which will be durable and easily adjusted.

With these and other objects in view this invention consists in the peculiar construction and arrangement of the various parts of a metallic packing as hereinafter described and more particularly pointed out in the appended claim.

Referring to the drawings wherein similar reference characters denote similar parts wherever used, the figure is a horizontal section through the improved packing.

The letter $a$ designates a packing member adapted to be placed in the stuffing box of a machine in connection with the double tapered member $b$, which engages the shaft $t$ as shown. Engaging the other tapered side of the member $b$ and overlapping the packing ring $a$ is a member $c$ which is provided with an outer inclined face $h$ which forms a small recess between the stuffing box ring $e$ and the packing member $c$. Within this recess is placed a conoidal member $k$ which carries a member $r$ of malleable metal which is adapted to be compressed slightly out of shape upon pressure being applied to the member $e$, and thus form a leak proof joint along the edge $h$ of the member $c$. Upon the outer surface of the packing ring $a$ is formed an upstanding lug $i$, which engages the walls of the packing box and leaves behind it a small recess which is occupied by a washer $g$, of malleable metal which is backed by the neck ring $f$, and which bears the entire pressure of the packing. The casing $d$ has formed therewith bolts $d'$ and $d''$. A collar $e$ encircles the shaft $t$ and engages against the packing. By screwing up the nuts upon the bolts $d'$ and $d''$ the member $e$ will compress the packing about the shaft $t$. By this arrangement of parts it is evident that the wear of the bearing will be distributed in the best possible manner, and that the bearing will form a leak-tight device which is greatly desired in the art.

What I claim as new and desire to secure by Letters Patent is:—

A rod packing comprising an inner packing ring having inclined portions thereon, a flattened portion on said packing ring, a compression ring engaging one of said inclined portions, flange upon said compression ring, a malleable metal washer backing said compression ring, a neck member backing said malleable washer, a second compression ring adapted to engage the other said inclined portion and said flattened portion, said second named compression ring overlapping said first named compression ring and completing a recess between the stuffing box and said second compression ring, a conoidal metal washer in said recess having a malleable metal periphery, means for causing a longitudinal movement of said second named compression ring whereby to compress said malleable washers to prevent leaks around the bearing.

In testimony whereof I have hereunto set my hand in presence of two witnesses.

PAUL CHAPPEAU.

Witnesses:
LEOPOLD DUPREY,
MAURICE BUBERT.

Copies of this patent may be obtained for five cents each, by addressing the "Commissioner of Patents, Washington, D. C."